United States Patent
Berkstresser

[15] 3,687,114
[45] Aug. 29, 1972

[54] PENDANT FOR FLEA PREVENTION AND PENDANT FOR FLEA COMPOUND

[72] Inventor: William E. Berkstresser, San Francisco, Calif.

[73] Assignee: Web Mercantile Corporation, Novato, Calif.

[22] Filed: Feb. 22, 1971

[21] Appl. No.: 117,539

[52] U.S. Cl. ................................................. 119/106
[51] Int. Cl. ............................................. A01k 27/00
[58] Field of Search .................. 239/36; 119/106, 109

[56] References Cited

UNITED STATES PATENTS

| | | | |
|---|---|---|---|
| 2,791,202 | 5/1957 | Doyle | 119/106 |
| 2,808,030 | 10/1957 | Costanzo | 119/106 |
| 3,477,409 | 11/1969 | Costanzo | 119/106 |

*Primary Examiner*—Aldrich F. Medbery
*Attorney*—Julian Caplan

[57] ABSTRACT

A pendant which is a hollow circular cross-section container, open at one end, and having a closure for the open end is formed with a pattern of apertures in its side walls and means for attachment to a conventional pet collar. A tablet, or lump, of 2,2-dichlorovinyl dimethyl phosphate and inert ingredients is place in the pendant. Heat from the pet slowly sublimes the active chemical, the fumes passing through the apertures in the pendant and thence to the skin of the pet, without danger of close proximity of the chemical to the skin. The chemical is a recognized flea and tick insecticide.

8 Claims, 5 Drawing Figures

PATENTED AUG 29 1972

3,687,114

INVENTOR.
WILLIAM E. BERKSTRESSER
BY *Julian Caplan*
ATTORNEY

PENDANT FOR FLEA PREVENTION AND PENDANT FOR FLEA COMPOUND

This invention relates to an new improved pendant for flea prevention for pets and to a method of repelling fleas and the like from pets.

Heretofore, flea repellant dog collars have been used, the collars having one or more pockets filled with a chemical which sometimes irritates the skin of pets but is otherwise quite effective for the purpose intended. The present invention provides a container for such chemicals which removes the chemical from close proximity to the skin and thus reduces the likelihood of irritation.

Thus, it is a principal purpose of the present invention to provide a pendant which may be attached to a pet collar, the pendant being supported close enough to the body of the pet to cause the fumes of the chemical to permeate along the skin and through the coat and yet which prevents any close proximity of the chemical to the skin.

A principal advantage of the invention is the convenience with which the pendant may be attached to and removed from a conventional pet collar.

Another advantage of the present invention is that there is no danger of harming the pet and the device is not likely to snag on shrubbery, fences, etc., as the pet runs unattended.

A still further advantage of the invention is the convenience with which the chemical may be replenished when it has become exhausted.

A feature of the invention is the fact that the pendant is an ornamental device which blends aesthetically with dog tags and other objects which are frequently attached to pet collars. Other objects of the present invention will become apparent upon reading the following specification and referring to the accompanying drawings in which similar characters of reference represent corresponding parts in each of the several views.

Figure 1:
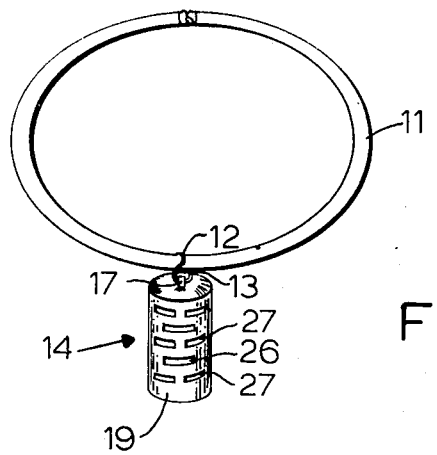
FIG. 1 is a perspective view, in reduced scale, showing the pendant attached to a conventional dog collar.
Figure 2:
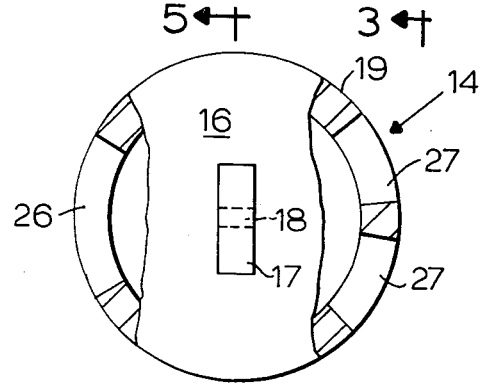
FIG. 2 is a top plan of the pendant, partly broken away to reveal internal construction.
Figure 5:
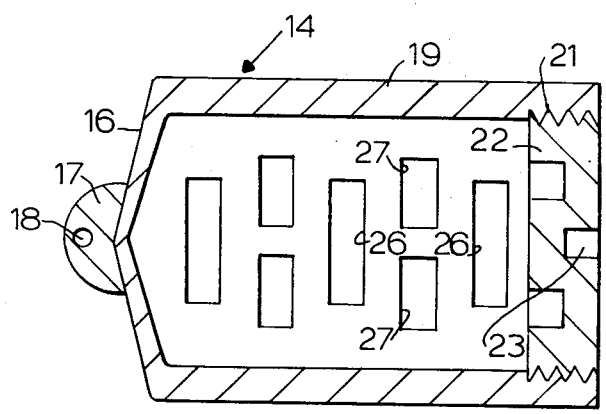

FIG. 5 is a longitudinal sectional view taken substantially along the line 5—5 of FIG. 2. A chemical used with flea repellent dog collars has as its active ingredient in a preferred form 2, 2-dichlorovinyl dimethyl phosphate and related compounds totalling about 9.6 percent and inert ingredients totaling about 90.4 percent. The phosphate is sprayed on the inert ingredient, and a preferred inert ingredient is polyvinyl chloride. Reference is made to U.S. Pat. No. 3,318,769 which relates to a resin composition with which the phosphate material is formulated. It will be understood that the inert ingredients are subject to considerable variation but the foregoing described is a preferred form. More generally, as stated in said patent, the phosphate is

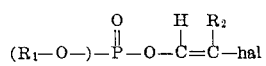

wherein $R_1$ represents an alkyl of from one to four carbon atoms, hal represents a middle halogen, and $R_2$ represents a member of the group consisting of hydrogen and middle halogen. As further stated, the carrier is a solid, organic, water-insoluble, hydrophobic, thermoplastic resin having a molecular weight above 1000.

Heretofore, such chemicals have been used in flea preventative pet collars worn around the neck of the pet and the heat of the body of the pet causes the phosphate to vaporize and to permeate the skin of the animal and effectively kill fleas, ticks and other undesirable parasites. As has been stated, the use of the chemical in a collar around the neck of the animal has in some instances irritated the skin sufficiently so as to make use of these collars harmful. The present invention removes the chemical from close proximity to the skin but still maintains the chemical in close proximity so that the chemical is effective.

Thus, to the conventional dog collar 11 which is placed around the neck of the pet, there is attached an "S"-shaped hook 13 to which is attached a pendant 14 containing the chemical. Other means to attach the pendant may be used, but the pendant should be near the animal but not in continuous close contact. The heat of the body of the animal causes the phosphate to vaporize from the inert ingredients and then to travel on the outside of the hide and kill insects of the type described.

Figure 3:
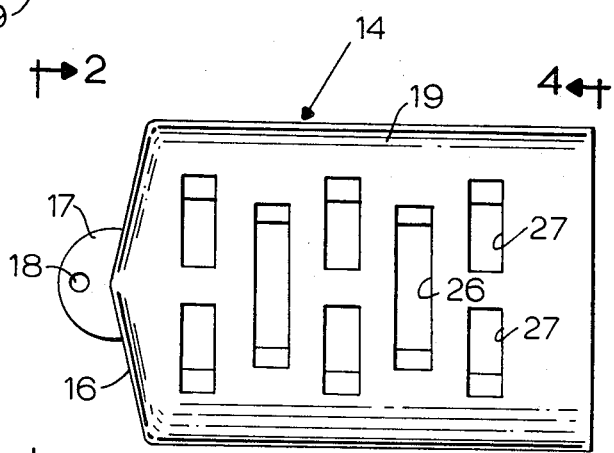
FIG. 3 is a side elevation as viewed from the right of FIG. 2.
Figure 4:
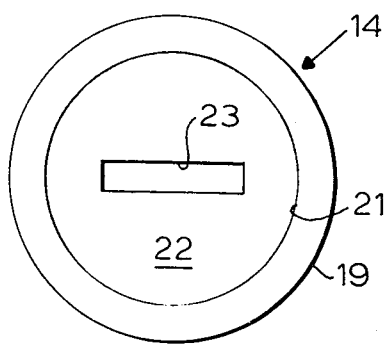
FIG. 4 is a bottom plan view.

Pendant 14 is preferably formed of a metal such as brass, suitably ornamentally plated. In the preferred form here illustrated, pendant 14 has a shallow conical top 16, and in the center is formed with an ear 17 having a hole 18 through which one end 13 of the hook 12 passes. Sides 19 are cylindrical and there is a threaded open bottom 21. Bottom 21 is closed by an externally threaded closure 22 turned by a coin or a screwdriver inserted in central slot 23. Preferably, the side walls 19 are formed with apertures 26, 27 in a pattern which enables the fumes of the chemical to escape but keeps the chemical from close proximity to the hide. A preferred pattern comprises rows of slots. In one row an elongated horizontal slot 26 is interspersed with shorter slots 27. Thus, as is shown in FIG. 3, viewed from one side, there are at the top two short apertures 27 and below these is a long aperture 26 and below this are two short apertures 27, all as illustrated. As viewed in FIG. 2, on the opposite side of the pendant from apertures 27 is a long aperture 26. It will be understood that the staggering of the long and short apertures is a matter which is subject to variation.

The bottom closure 22 is removed and the chemical, in tablet or lump form, is inserted inside the pendant and the closure 22 replaced. The hook 12 is used to hook the pendant 14 on to a collar 11 or other convenient attachment may be used. The chemical is effective for a period of approximately three months, the phosphate compound gradually being vaporized and used effectively. When the compound is exhausted, the closure 22 is removed and a new tablet, or pellet, or lump of material is inserted for replenishment.

What is claimed is:

1. A device for flea repellant comprising a hollow casing, said casing having a loading aperture, a closure for said aperture said casing formed with a plurality of second apertures smaller than said loading aperture for the escape of chemical fumes from the interior of said casing, and means on said casing for attaching said casing to a pet collar, and a mass in said casing consisting of a normally solid, water-sensitive phosphate having the formula:

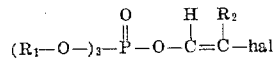

wherein $R_1$ represents an alkyl of from 1 to 4 carbon atoms, hal represents a middle halogen, and $R_2$ represents a member of the group consisting of hydrogen and middle halogen, and an inert ingredient in which said phosphate is soluble in solid solution consisting of a solid, organic, water-insoluble, hydrophobic thermoplastic resin having a molecular weight above 1000.

2. A device according to claim 1 in which said casing has a cylindrical wall, said loading aperture is at one end of said wall and said second apertures are formed in said cylindrical wall and distributed around the circumference and along the length of said wall.

3. A device according to claim 1, in which said one end is threaded and said closure is threaded to mate with the threads on said casing.

4. A device according to claim 1 in which said phosphate is 2, 2-dichlorovinyl dimethyl phosphate.

5. A device according to claim 4 in which said inert ingredient is a polyvinyl chloride.

6. A method of repelling fleas from pets comprising providing a pendant filled with a flea which has a flea killing ingredient which volatilizes over a prolonged period of time, attaching said pendant to a pet collar, applying said collar to a pet, said ingredient volatilizing and spreading throughout the skin area of the pet to kill fleas which may be present in the coat of the pet, and said flea-killing ingredient being a normally solid, water-sensitive phosphate having the formula:

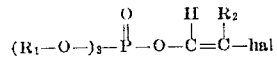

wherein $R_1$ represents an alkyl of from one to four carbon atoms, hal represents a middle halogen, and $R_2$ represents a member of the group consisting of hydrogen and middle halogen, and dispersed in an inert ingredient.

7. A method according to claim 6 in which said flea-killing ingredient is 2, 2-dichlorovinyl dimethyl phosphate.

8. A method according to claim 7 in which said inert ingredient is a polyvinyl chloride.

* * * * *